United States Patent [19]

Lewis

[11] Patent Number: 4,645,815

[45] Date of Patent: Feb. 24, 1987

[54] HEAT CURABLE ORGANOPOLYSILOXANE COMPOSITIONS

[75] Inventor: Larry N. Lewis, Scotia, N.Y.

[73] Assignee: General Electric Company, Schenectady, N.Y.

[21] Appl. No.: 793,395

[22] Filed: Oct. 31, 1985

[51] Int. Cl.⁴ ............................................. C08G 77/06
[52] U.S. Cl. ...................................... 528/15; 528/31; 528/32; 528/23; 525/478
[58] Field of Search ...................... 528/15, 31, 32, 23; 525/478

[56]  References Cited

U.S. PATENT DOCUMENTS

| | | | |
|---|---|---|---|
| 3,445,420 | 5/1969 | Kookootsedes et al. | 260/37 |
| 3,882,083 | 5/1975 | Berger et al. | 260/46.5 |
| 4,472,562 | 9/1984 | Shirahata | 528/15 |
| 4,472,563 | 9/1984 | Chandra et al. | 528/15 |
| 4,529,553 | 7/1985 | Faltynek | 528/15 |
| 4,550,152 | 10/1985 | Faltynek | 528/15 |

Primary Examiner—Melvyn I. Marquis
Attorney, Agent, or Firm—William A. Teoli; James C. Davis, Jr.; James Magee, Jr.

[57] ABSTRACT

Cyclometallized platinum phosphite catalysts have been found to provide heat curable organopolysiloxanes having superior shelf life without the use of a platinum inhibitor.

4 Claims, No Drawings

HEAT CURABLE ORGANOPOLYSILOXANE COMPOSITIONS

CROSS REFERENCE TO RELATED APPLICATIONS

Reference is made to copending application Ser. No. 793,359, filed Oct. 31, 1985, Keohan et al., for Heat Curable Silicone Polyimide Compositions, assigned to the same assignee as the present invention and incorporated herein by reference.

BACKGROUND OF THE INVENTION

Prior to the present invention, as shown by Kookootsedes et al., U.S. Pat. No. 3,445,420, one component organopolysiloxane compositions were based on a platinum catalyzed silicon hydride-silicon vinyl addition reaction which generally utilized an inhibitor for the platinum catalyst. The purpose of the inhibitor was to slow down the hydrosilation reaction to increase the work life of the one component organopolysiloxane mixture at low or room temperature. The organopolysiloxane mixtures were generally composed of a base polymer consisting of a polydiorganosiloxane having chemically combined methylvinylsiloxy units which was used with a cross-linking siliconhydride-siloxane having chemically combined organosilicon hydride siloxy units. Additional inhibited one package silicon hydride-silicon vinyl one package platinum addition curable organopolysiloxane compositions are shown by Berger et al., U.S. Pat. No. 3,882,083, utilizing an ethyleneically unsaturated isocyanurate as an inhibitor, and U.S. Pat. Nos. 4,472,562 and 4,472,563 employing acetylenic unsaturated inhibitors.

Although the inhibitors utilized in the aforementioned one package platinum catalyzed organopolysiloxane compositions generally imparted improved shelf life stability to the resulting heat curable organopolysiloxane composition, improvements in shelf life stability at ambient temperatures with increased activity at elevated temperatures, such as 150° C., are constantly being sought. In addition, it would be desirable to utilize one package organopolysiloxane compositions having an effective amount of a platinum cure catalyst which does not require the use of an organic or inorganic inhibitor.

The present invention is based on my discovery that certain cyclometallized platinum phosphite complexes, as defined hereinafter, have been found to provide significantly improved inhibitor-free, one package organopolysiloxane compositions comprising organopolysiloxane having chemically combined monovalent olefinically unsaturated organic radicals attached to silicon by carbon-silicon linkages which is utilized in combination with organopolysiloxane having chemically combined hydrogen atoms attached to silicon by silicon-hydride linkages. In addition, the shelf life of the one package organopolysiloxane composition at ambient temperatures utilizing such cyclometallized platinum phosphite catalyst have been found to be superior to the inhibited platinum catalyzed one package organopolysiloxane compositions of the prior art.

STATEMENT OF THE INVENTION

There is provided by the present invention, a heat curable organopolysiloxane composition comprising (A) an olefinically unsaturated organopolysiloxane having chemically combined structural units of the formula

(B) an organo hydrogen polysiloxane having chemically combined structural units of the formula

 and (C) an effective amount of platinum catalyst having the formula

where R is a member selected from the class consisting of $C_{(1-14)}$ monovalent hydrocarbon radicals and substituted $C_{(1-14)}$ monovalent hydrocarbon radicals, $R^1$ is a $C_{(1-10)}$ olefinically unsaturated aliphatic radical, $R^2$ is a $C_{(6-14)}$ divalent aromatic hydrocarbon radical or substituted $C_{(6-14)}$ divalent aromatic hydrocarbon radical, $R^3$ and $R^4$ are selected from R radicals, X is a halogen radical, a is a whole number having a value of 0 to 3 inclusive and preferably a has an average value in the organopolysiloxane of from 0.5 to 2 inclusive, b has an average value of 0.005 to 2.0 inclusive and the sum of a and b is equal to from 0.8 to 3 inclusive.

The olefinically unsaturated organopolysiloxanes having structural units represented by formula 1 include fluid organopolysiloxanes which preferably are free of silanic hydrogen, and contain olefinic unsaturation by means of double bonds between two adjacent aliphatic carbon atoms. Among the radicals which R represents in formulas 1 and 2 are included alkyl, such as methyl, ethyl, propyl, isopropyl, butyl, octyl, dodecyl, and the like, cycloalkyl, such as cyclopentyl, cyclohexyl, cycloheptyl, and the like, aryl such as phenyl, naphthyl, tolyl, xylyl, and the like, aralkyl, such as benzyl, phenylethyl, phenylpropyl, and the like; halogenated derivatives of the aforesaid radicals including chloromethyl, trifluoromethyl, chloropropyl, chlorophenyl, dibromophenyl, tetrachlorophenyl, difluorophenyl, and the like; cyanoalkyl, such as beta-cyano ethyl, gamma-cyanopropyl, beta-cyanopropyl and the like. Preferably R is methyl. Moreover, in formulas 1 and 2 R is intended to include materials where R is a mixture of the aforesaid radicals.

Among the radicals represented by $R^1$ in formula 1 there are included alkenyl, such as vinyl, allyl, methallyl, butenyl, pentyl, and the like. Preferably, $R^1$ is vinyl or allyl and most preferably $R^1$ is vinyl. $R^2$ in formula (3) can be phenylene, naphthalene, anthralene and alkylated or halogenated derivatives thereof. Preferably, $R^2$ is phenylene.

The olefinically unsaturated organopolysiloxanes encompassed within formula 1 are well known in the art, as particularly manifested by U.S. Pat. No. 3,344,111 to Chalk, and U.S. Pat. No. 3,436,366 to Modic, which are incorporated herein by reference. Similarly, their preparation and/or commercial availability is also well known.

Specific materials included within the scope of the olefinically unsaturated organopolysiloxanes of formula 1 are low molecular weight materials, such as vinylpentamethyldisiloxane, 1,3-divinyltetramethyldisiloxane, 1,1,3-trivinyltrimethyldisiloxane, 1,1,3,3-tetravinyldimethyldisiloxane, as well as higher polymers containing up to 100,000 or more silicon atoms per molecule. Also included within the scope of the olefinically unsaturated organopolysiloxanes of formula 1 are cyclic materials containing silicon-bonded vinyl or allyl radicals, such as the cyclic trimer, tetramer or pentamer of methylvinylsiloxane

((CH$_2$=CH)(CH$_3$)SiO)

or methyl allylsiloxane
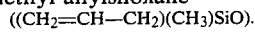
((CH$_2$=CH—CH$_2$)(CH$_3$)SiO).

Among these cyclic materials, tetramethyltetraallylcyclotetrasiloxane and tetramethyltetravinylcyclotetrasiloxane are preferred.

A preferred class of organopolysiloxane compositions within the scope of the present invention are those disclosed by Modic in U.S. Pat. No. 3,436,366, incorporated herein by reference. These compositions comprise (1) 100 parts by weight of a liquid vinyl chain-stopped polysiloxane having the formula

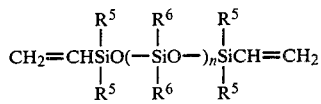

wherein $R^5$ and $R^6$ are monovalent hydrocarbon radicals free of aliphatic unsaturation, with at least 50 mole percent of the $R^6$ groups being methyl, and where n has a value sufficient to provide a viscosity of from about 50,000 to 750,000 centistokes at 25° C., preferably from about 50,000 to 180,000 and (2) from 20 to 50 parts by weight of an organopolysiloxane copolymer comprising $(R^7)_3SiO_{0.5}$ units and $SiO_2$ units, where $R^7$ is a member selected from the class consisting of vinyl radicals and monovalent hydrocarbon radicals free of aliphatic unsaturation, where the ratio of $(R^7)_3SiO_{0.5}$ units to $SiO_2$ units is from about 0.5:1 to 1:1, and where from about 2.5 to 10 mole percent of the silicon atoms contain silicon-bonded vinyl groups.

The vinyl chain-stopped organopolysiloxane component is typified by various compositions where the monovalent hydrocarbon radicals represented by $R^5$ and $R^6$ include alkyl radicals, e.g., methyl, ethyl, propyl, butyl, octyl, etc.; aryl radicals, e.g., phenyl, tolyl, xylyl, etc.; cycloalkyl radicals, e.g., cyclohexyl, cyclohepthyl, etc.; aralkyl radicals, e.g., benzyl, phenylethyl, etc. Preferably, all of the radicals represented by $R^5$ and $R^6$ are selected from the group consisting of methyl and phenyl radicals and most preferably $R^5$ and $R^6$ are methyl. In the organopolysiloxane copolymer component $R^7$ can be vinyl and/or monovalent hydrocarbon radicals free of aliphatic unsaturation, with at least the stated proportion of $R^7$ groups being vinyl. The $R^7$ groups which are not vinyl can be selected from $R^5$ and $R^6$ groups and are preferably methyl.

The organohydrogenpolysiloxanes having structural units represented by formula 2 are intended to broadly cover fluid organopolysiloxanes which are preferably free of olefinic unsaturation and which contain silanic hydrogen. These organohydrogenpolysiloxanes represented by formula 2 are also well known in the art as shown by U.S. Pat. No. 3,344,111 to Chalk, and U.S. Pat. No. 3,436,366, incorporated herein by reference.

Materials specifically encompassed within formula 2 include 1,3-dimethyldisiloxane, 1,1,3,3-tetramethyldisiloxane, as well as higher polymers containing up to 100,000 or more silicon atoms per molecule. Also included within the scope of formula 2 are cyclic materials, such as cyclic polymers of methyl hydrogen siloxane having the formula

(CH$_3$SiHO)$_x$ where x is a whole number equal to from 3 to 10 and preferably 3 or 4 such as tetramethylcyclotetrasiloxane.

Within the scope of formula 2 are siloxane units such as hydrogen siloxane units (H$_2$SiO)$_{1.5}$, methyl hydrogen siloxane units CH$_3$(H)SiO, dimethyl hydrogen siloxane units, and dihydrogen siloxane units (H$_2$SiO). These copolymers can contain from 0.5 to 99.5 mole percent of (R)$_a$SiO units chemically combined with 0.5 to 99.5 mole percent of siloxy units having at least one hydrogen including a mixture of hydrogen and R radicals attached to silicon.

There are included within the platinum catalyst of formula (3) where Ph is phenyl, compounds such as

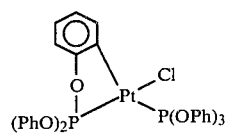

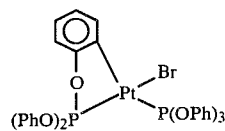

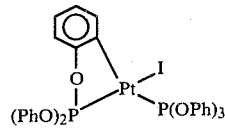

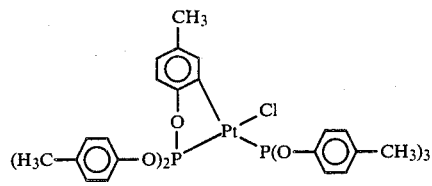

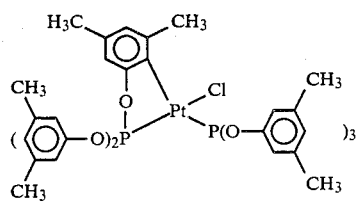

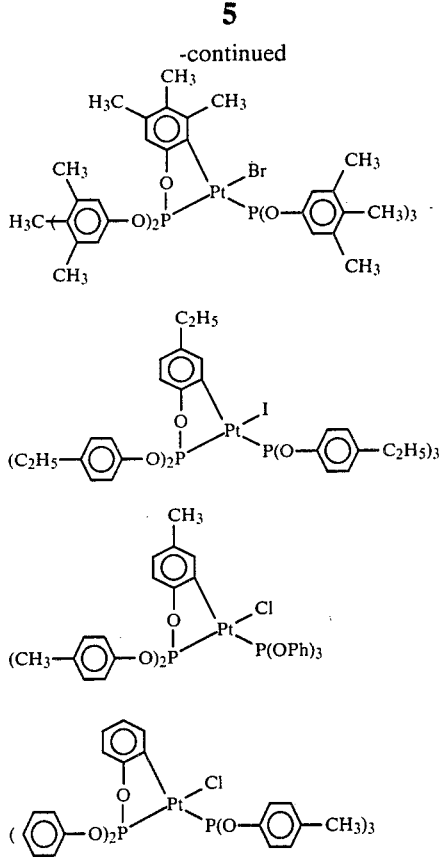

These platinum phosphites and method for making are shown by N. Ahmad, E. W. Ainscough, T. A. James, S. D. Robinson, *J.C.S. Dalton* (1973) 1148 and 1151.

An effective amount of platinum catalyst is 10 to 100 ppm of platinum, per part of heat curable organopolysiloxane.

The compositions of the present invention are particularly useful in areas where good release behavior is desired, such as in molding applications. Moreover, the compositions of the present invention are useful as potting compositions, particularly for electronic components. Furthermore, the present compositions, depending upon the particular substrate, can also be useful where primerless adhesion is desired. Specifically, the compositions of the present invention have found particular application in the coating of electronic component substrates, such as wire. In addition, the compositions of the present invention are generally useful for those applications in which organosilicon compositions of this nature have become well known.

In order that those skilled in the art will be better able to practice the present invention, the following examples are given by way of illustration and not by way of limitation. All parts are by weight unless otherwise indicated.

EXAMPLE 1

A solution of 0.47 grams (1.03 millimole) of disodium platinum tetrachloride and 0.716 grams (2.31 millimole) of triphenylphosphite and 15 ml. of ethanol was agitated and gently heated for two minutes and then cooled to $-20°$ C. for 120 minutes. A white solid was collected by filtration and washed with aqueous ethanol, methanol and heptane. The resulting product was recrystallized from methylene chloride in methanol to provide 0.429 gram or a 46% yield of product having a melting point of 187°–9° C. Based on method of preparation the product was a platinum complex having the formula

$Cl_2Pt[P(OPh)_3]$

A solution of 0.306 grams (0.35 millimole) of the above platinum complex and 6 ml. of decalin was heated to reflux under nitrogen for 17 hours. The solution was cooled to room temperature and white solid was collected by filtration which was washed with hexane, methanol-water and then hexane. The solid was recrystallized from methylene chloride/methanol. There was obtained 0.229 grams (64% yield) of a solid having a melting point of 155° C. Based on method of preparation, the solid was a cyclometallized platinum phosphite having the formula

$(C_6H_5O)POC_6H_4PtCl[P(OC_6H_5)_3]$.

A heat curable platinum catalyzed organopolysiloxane composition was prepared consisting of 100 parts of a vinyl containing base formulation, 10 parts of a silicon hydride cross-linker and 10 ppm of platinum utilizing the above cyclometallized platinum phosphite. The vinyl containing base formulation consisted of 75% by weight of a polydimethylsiloxane having a viscosity of about 80,000 centipoises and terminal vinyl dimethylsiloxy units and 25% by weight of a resin having molar proportions of 0.7 mole of dimethylsiloxy units, 1 mole of tetrasiloxy units, and 1.7 moles of methylvinylsiloxy units. The silicon hydride cross-linker consisted of 50% by weight of a polydimethylsiloxane having a viscosity of about 4,000 centipoise at 25° C. and terminal dimethylvinylsiloxy units and 50% by weight of a siloxane resin consisting of dimethyl hydrogen siloxy units chemically combined with tetrasiloxy units.

A control formulation was also prepared following the same procedure, except that in place of the platinum phosphite catalyst, (phosphite) there was used 10 ppm of platinum catalyst shown by Lamoreaux U.S. Pat. No. 3,197,432 (control).

Respective curable platinum catalyzed organopolysiloxane compositions were evaluated for pot life at room temperature, and at a 50° C. heat age as well as determination of the properties obtained in the resulting cured products for the Control and Phosphite. The following results were obtained, where the formulations utilizing the control catalyst were evaluated after one hour at 100° C. while the formulations cured with the phosphite catalyst were evaluated after 7 minutes at 200° C.

|  | Control | Phosphite |
| --- | --- | --- |
| Cure | 1 h, 100° C. | 7 min 200° C. |
| Tensile strength (psi) | 600 | 700 |
| % Elongation | 300 | 300 |
| Shore A hardness | 45 | 43 |
| Tear strength, pi | 50 | 50 |

The above results show that the phosphite catalyst provided excellent physical properties in the resulting cured product. A faster cure was achieved at a higher temperature.

EXAMPLE 2

A mixture of 9 parts of a polydimethylsiloxane fluid having a viscosity of 500 centipoises and 1% by weight of chemically combined vinyl silicon siloxy units, 1 part of a methyl siloxane having 1.5% by weight of chemically combined silicon hydride siloxy units and 3 ppm of the platinum phosphite catalyst of Example 1 was placed in a sealed container and allowed to rest under ambient conditions for an extended shelf period. It was found that the mixture gelled after 92 days at 25° C. The same formulation was heated to 100° C. and it was found to gel in 3.2 minutes.

The above procedure was repeated, except that in place of the platinum phosphite catalyst there was utilized 11 ppm of platinum of the Lamoreaux catalyst of Example 1 containing 10,000 ppm of a 3-methyl-1-butn-30-Ol inhibitor as taught by Kookoostedes. The shelf life of the inhibited platinum catalyzed silicone formulation was found to be 53 days at 25° C., while the same formulation gelled in 217 minutes at 82° C. and 47 minutes at 119° C.

The above results show that the cyclometallized platinum phosphite catalyst of the present invention can provide a shelf life which is superior to platinum catalyzed organopolysiloxane formulation having inhibited platinum catalyst.

Although the above examples are directed to only a few of the very many variables which can be utilized in the heat curable cyclometallized phosphite platinum catalyzed organopolysiloxane compositions of the present invention and method curing such compositions, it should be understood that a much broader variety of vinyl containing and silicon hydride containing organopolysiloxane compositions as well as cyclometallized platinum phosphite catalysts can be used as shown in the description preceding these examples.

What I claim as new and desire to secure by Letters Patent of the United States is:

1. A heat curable organopolysiloxane composition comprising
    (A) an olefinically unsaturated organopolysiloxane having chemically combined structural units of the formula

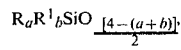

(B) an organo hydrogen polysiloxane having chemically combined structural units of the formula

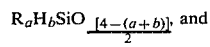 and (C) an amount of platinum phosphite having the formula

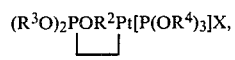

which is effective as a platinum catalyst where R is a member selected from the class consisting of $C_{(1-14)}$ monovalent hydrocarbon radicals and substituted $C_{(1-14)}$ monovalent hydrocarbon radicals, $R^1$ is a $C_{(1-10)}$ olefinically unsaturated aliphatic radical, $R^2$ is a $C_{(6-14)}$ divalent aromatic hydrocarbon radical or substituted $C_{(6-14)}$ divalent aromatic hydrocarbon radical, $R^3$ and $R^4$ are each as defined by R, X is a halogen radical, a is a whole number having a value of 0 to 3 inclusive and b has an average value of 0.005 to 2.0 inclusive and the sum of a and b is equal to from 0.8 to 3 inclusive.

2. A heat curable organopolysiloxane composition in accordance with claim 1, where R is methyl and $R^1$ is vinyl.

3. A heat curable organopolysiloxane composition in accordance with claim 1, where the platinum catalyst is

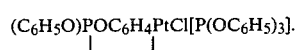

4. A heat curable organopolysiloxane composition comprising a vinyl substituted dimethylpolysiloxane, a hydride substituted siloxane and an effective amount of

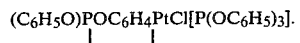

* * * * *

UNITED STATES PATENT AND TRADEMARK OFFICE
CERTIFICATE OF CORRECTION

PATENT NO. : 4,645,815

DATED : February 24, 1987

INVENTOR(S) : Larry N. Lewis

It is certified that error appears in the above-identified patent and that said Letters Patent is hereby corrected as shown below:

In the specification, column 2, line 5, please delete

"$RaR^1_bSiO_{[4-\frac{(a+b)}{2}]}$" and please insert therefor

-- $RaR^1_bSiO_{[4-\frac{(a+b)}{2}]}$ --.

In the specification, column 2, line 11, please delete

"$RaHbSiO_{[4-\frac{(a+b)}{2}]}$" and please insert therefor

-- $RaHbSiO_{[4-\frac{(a+b)}{2}]}$ -- .

Signed and Sealed this

Fourth Day of September, 1990

*Attest:*

HARRY F. MANBECK, JR.

*Attesting Officer*     *Commissioner of Patents and Trademarks*